UNITED STATES PATENT OFFICE.

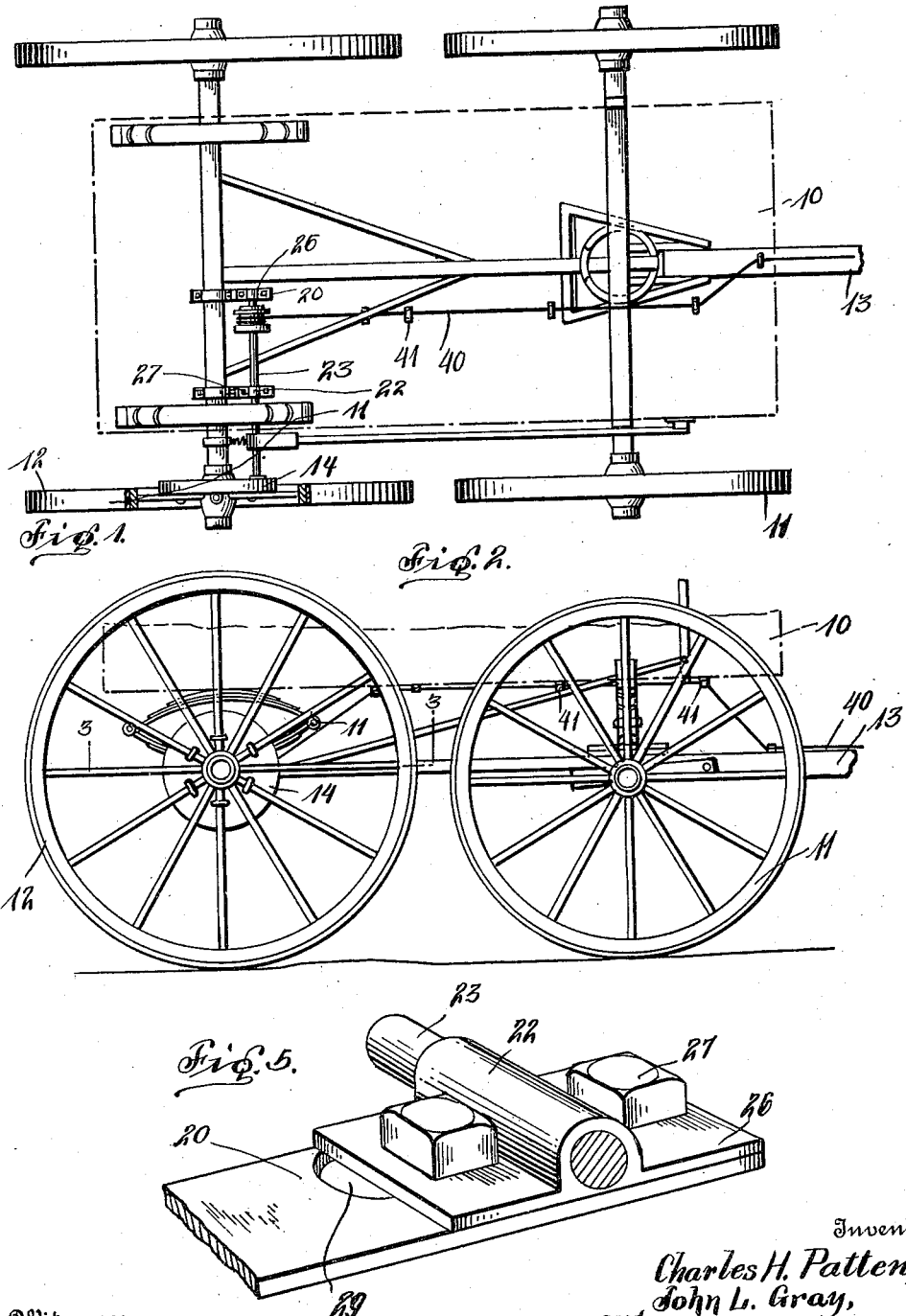

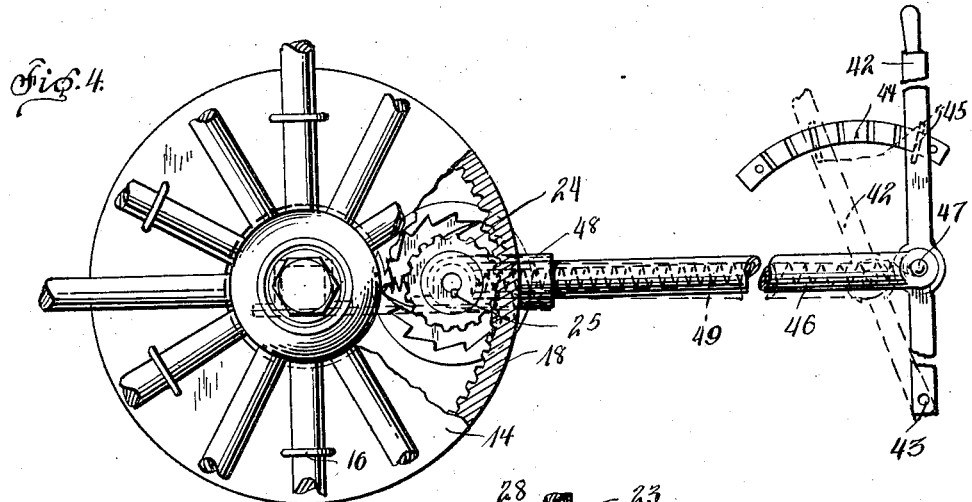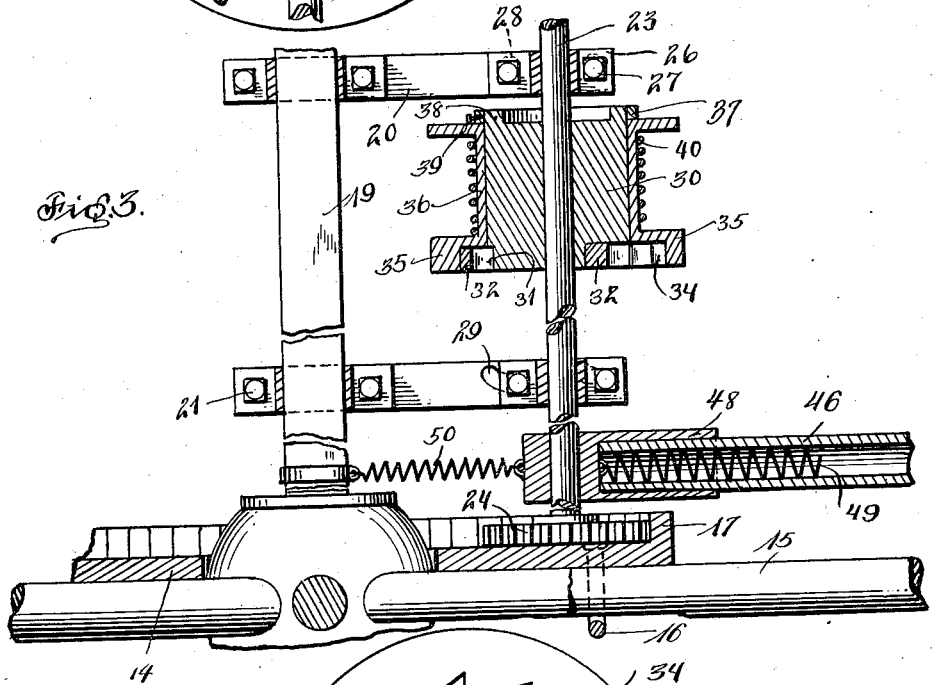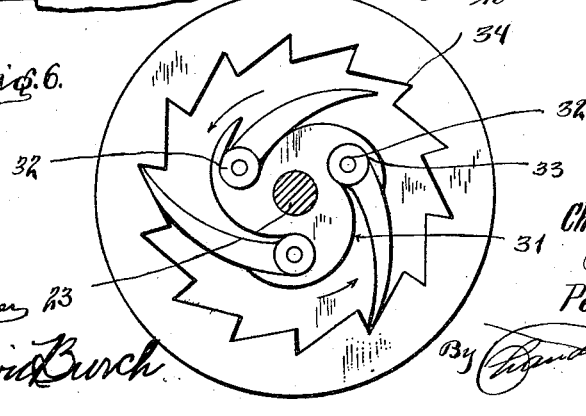

CHARLES H. PATTEN, JOHN L. GRAY, AND PEDER J. BUE, OF MOSCOW, IDAHO; SAID BUE ASSIGNOR TO SAID GRAY.

HITCHING DEVICE.

1,031,815.  Specification of Letters Patent.  Patented July 9, 1912.

Application filed April 25, 1911. Serial No. 623,222.

*To all whom it may concern:*

Be it known that we, CHARLES H. PATTEN, JOHN L. GRAY, and PEDER J. BUE, citizens of the United States, residing at Moscow, in the county of Latah, State of Idaho, have invented certain new and useful Improvements in Hitching Devices; and we do hereby declare the following to be a full, clear, and exact description of the invention, such as will enable others skilled in the art to which it appertains to make and use the same.

This invention relates to new and useful improvements in hitching devices or holdbacks adapted for use in place of the ordinary hitching weight now in common use.

An object of the invention is to provide a hitching line or strap which is connected to the bits of the draft animals or animal and extended beneath the body of a vehicle and wound upon a suitable pulley so that a suitable shaft which carries said pulley and has operative connection from one of the rear wheels of the vehicle will rotate to wind the line upon the pulley if the animals make an attempt to run away and thus pull the vehicle forwardly, said pulley being adapted to operate independently of the shaft if the vehicle is moved rearwardly.

A further object of the invention is to provide a novel mounting for the shaft carrying the pulley, whereby a pinion carried at one end thereof may be moved into and out of engagement with an internal gear carried by one of the rear wheels by pivotal movement of the shaft at the opposite end.

A still further object of the invention is to provide an operating lever which may be positioned adjacent the seat of the vehicle or wagon for convenient use and which is so connected with the shaft that means may be provided for preventing binding or slipping of the intermeshed gears carried by the wheel and shaft, thus compensating for any variation in the position of the gears or the wheel to which one of said gears is secured.

A still further object of the invention is to provide means for assisting the operation of the lever and its connecting rod with the shaft, to throw said gears apart for inoperation.

The invention consists of certain other combinations and arrangements of parts, as will be hereinafter more fully described and clearly specified in the appended claim.

In the drawings:—Figure 1 is a top plan view of a vehicle provided with our improved hitching device, the body of the vehicle being removed. Fig. 2 is a side elevation thereof. Fig. 3 is a detailed sectional view taken on the line 3—3 of Fig. 2. Fig. 4 is a detailed side elevation of the rear wheel to which the internal gear is attached and showing the connections between the lever and the pinion operated thereby, certain of the parts being broken away. Fig. 5 is a detailed perspective view of one of the bearings for the operating shaft. Fig. 6 is a detailed end view of the line carrying pulley, also showing its mounting upon the operating shaft.

Referring to the drawings in detail, there is shown a vehicle having a body 10, front wheels 11, rear wheels 12 and a draft tongue 13. Mounted upon one of the rear wheels 12 is an internal gear which comprises a circular plate member 14 fastened to the spokes 15 of said wheel by means of the U-clips 16 having burs threaded upon their inner ends, said plate member 14 having an inwardly flanged rim 17 formed with internal teeth 18. Secured at spaced points to the rear axle 19 are supporting arms 20, said arms being secured to the axle which is preferably square, by means of suitable fastening means 21 so as to be supported in a horizontal position and to one side of the center of the length of the axle. These arms or supports carry upon their outer ends, journal boxes 22 for rotatably mounting a shaft 23 in parallel relation with the rear axle and the outer end of said shaft carries a pinion or gear wheel 24 which is adapted to mesh with the teeth 18 of the internal gear in order to impart rotation from the rear wheel to the shaft and said pinion may be keyed to the shaft in any desired manner such as shown at 25. In order to permit pivotal movement of the shaft 23 in a longitudinal line from its inner end, the innermost bearing 22 is formed with plate extensions 26 having apertures therethrough for receiving bolts 27 and the arm is provided with transverse slots 28 so that said bolts may have free movement when the shaft is moved in an arc upon the other of the arms 20. The latter arm is provided with similar bolts 27 having head portions engaging the extensions 26 and which are movable in curved slots 29 in the arm when the shaft is pivoted in its bearings through the medium of the transverse slots 28, thereby permitting the pinion 24 to be moved into and out of engagement with the internal gear.

Keyed to the shaft 23 adjacent its inner end is a spool or drum 30, which at one end is recessed as shown at 31 for receiving a series of pivotally mounted pawls 32, said recesses having circular portions 33 for receiving the heads of the pawls so that said pawls may operate by gravity within the slots to engage with the internal ratchet teeth 34 formed upon a flange 35 of a pulley 36. The pawls are adapted to engage with the teeth when at their lowermost position and drop by gravity from the teeth when in their uppermost position, as is more clearly shown in Fig. 6 of the drawings and the pulley 36 is loosely mounted upon the spool 30, being retained thereon by means of a collar 37 which is disposed over an extension 38 formed upon the spool and secured by pins or other means as shown at 39. The pulley is also formed with flanged rims so as to retain a pull cord or line 40 thereon, one end of the line being secured to the pulley and being adapted for rotation therewith in the operation of the device as will be hereinafter set forth. This line 40 is passed through suitable loops or guides 41 carried by the tongue 13 to be attached extended along the tongue 13 to be attached to the bits of the draft animals in any desirable manner, such as by means of a buckle or snap-hook usually employed in harness fittings.

In order to permit the shaft 23 to be moved for the disengagement of the gear 24 from the internal gear 18, a lever 42 is pivotally mounted upon the side of the vehicle body or otherwise as shown at 43 and is adjustable through the medium of the segmental rack 44 by engagement with a projection 45 formed upon the lever. A hollow rod 46 is pivotally secured at its forward end, intermediate the length of the lever as shown at 47 and extends rearwardly and longitudinally in line with the shaft 23. A ferrule 48 is secured to the shaft 33 adjacent its outer end and is adapted to receive the rear end of the rod 46 for sliding movement therein, said rod being adapted to engage the end wall of the ferrule when the lever is moved to the position shown in dotted lines in Fig. 4 of the drawings so as to disengage the pinion 24 from the internal gear 18 but being adapted to move independently of the ferrule and its connected shaft when moved to the forward position shown in the full lines. A coiled spring 49 is mounted within the hollow rod 46, said spring having its forward end connected to the lever 42 and its rear end connected to the ferrule for movement with the shaft 23, so that when the lever 42 is in its forward position, the spring will exert forward pull upon the shaft 23 to move the pinion 24 in engagement with the internal gear wheel and in this position the rod 46 will be removed from the end wall of the ferrule. When the lever is moved rearwardly to the position shown in dotted lines, the rear end of the rod 46 will engage the end wall of the ferrule removing the strain of the spring 49 and disengaging the pinion 24 from the internal gear. This latter action is assisted by a coiled spring 50 which is secured to the rear axle 19 and to the sleeve portion of the ferrule which engages around the shaft 23, said spring 50 being weaker than the spring 49 and provided to assist the operation of the lever in spacing the gears.

In the operation of the device, when the driver desires to leave the vehicle the lever 42 is moved to its forward position to allow the spring 49 to throw the shaft 23 in its arcuate path for the engagement of the pinion with the internal gear 18 so that should the draft animals move forwardly, the shaft will be rotated with the rear wheel thus causing the spool 30 to rotate and to carry the pulley 36 therewith by engagement of the pawls 32 with the ratchet teeth 34, thus winding the pull cord or line 40 upon the pulley to exert pull upon the animals' bits and thus restrain their further advance, as in bringing the animals to a stop. It will also be evident that if the animals are backed with the lever in a forward position and the gears in mesh, the pawls 32 will slide freely upon the ratchet teeth 34, thus allowing the spool to revolve loosely within the pulley without shortening the pull cord but when the lever is in a rearward position, the gear wheels will be positively held disengaged and operation of the device prevented.

From the foregoing description it will be readily seen that the device may be attached to vehicles now in common use without materially altering their construction and by reason of the simplicity of the operating parts, may be manufactured economically and will prove durable in use and positive in operation. By reason of the improved pivotal mounting of the shaft 23 within the journal bearings or boxes 22, said shaft will be held in a positive line for the proper engagement of the gear wheels, as the plate extensions 26 will be held in frictional contact with the arms 20 by the bolts 27 and mutilation of the teeth of the gears is thereby prevented. The provision of the springs 49 and 50 also obviates the necessity of extraordinary exertion in operating the lever 42 and its connecting rod 46, in moving the gears to operative and inoperative positions.

We claim:—

A hitching device comprising a shaft pivotally mounted at its inner end centrally of the width of the body, supports for said shaft, operative connections between one end of the shaft and one of the wheels of the vehicle, a pivoted lever, a hollow rod connected to the lever, a ferrule secured to the shaft and adapted to receive the rear end of the rod for sliding movement and a spring connecting the lever and ferrule.

In testimony whereof, we affix our signatures in presence of two witnesses.

CHARLES H. PATTEN.
JOHN L. GRAY.
PEDER J. BUE.

Witnesses:
GEO. T. MANNING,
R. E. GARRISON.

Copies of this patent may be obtained for five cents each, by addressing the "Commissioner of Patents, Washington, D. C."